United States Patent
Maehiro

(10) Patent No.: US 8,103,736 B2
(45) Date of Patent: Jan. 24, 2012

(54) STATUS NOTIFYING METHOD IN COMMUNICATION SYSTEM, STATUS NOTIFYING SERVER AND COMMUNICATION SYSTEM

(75) Inventor: Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1795 days.

(21) Appl. No.: 10/106,350

(22) Filed: Mar. 27, 2002

(65) Prior Publication Data

US 2002/0156844 A1 Oct. 24, 2002

(30) Foreign Application Priority Data

Apr. 24, 2001 (JP) ................................. 2001-126437
Mar. 26, 2002 (JP) ................................. 2002-084835

(51) Int. Cl.
*G06F 15/16* (2006.01)
(52) U.S. Cl. ........................................ 709/207; 709/204
(58) Field of Classification Search .......... 709/203–207, 709/219, 224; 463/42
See application file for complete search history.

(56) References Cited

U.S. PATENT DOCUMENTS

| 5,534,855 | A | * | 7/1996 | Shockley et al. | 340/5.52 |
| 5,889,945 | A | | 3/1999 | Porter et al. | |
| 6,175,873 | B1 | | 1/2001 | Yamane et al. | |
| 6,205,478 | B1 | | 3/2001 | Sugano et al. | |
| 6,446,112 | B1 | * | 9/2002 | Bunney et al. | 709/204 |
| 7,185,059 | B2 | * | 2/2007 | Daniell et al. | 709/206 |
| 7,249,161 | B2 | * | 7/2007 | Srinivas et al. | 709/206 |
| 2002/0052919 | A1 | * | 5/2002 | Morris et al. | 709/205 |
| 2002/0083134 | A1 | * | 6/2002 | Bauer et al. | 709/204 |
| 2002/0095571 | A1 | * | 7/2002 | Bradee | 713/164 |
| 2003/0191846 | A1 | * | 10/2003 | Hunnicutt et al. | 709/229 |
| 2004/0193722 | A1 | * | 9/2004 | Donovan | 709/230 |

FOREIGN PATENT DOCUMENTS

| EP | 0944002 | 9/1999 |
| EP | 1071295 | 1/2001 |
| JP | 10271159 | 10/1998 |
| JP | 11259393 | 9/1999 |
| JP | 2000-32033 | 1/2000 |
| JP | 2000-92153 | 3/2000 |
| JP | 2001-14254 | 1/2001 |
| JP | 2001-222498 | 8/2001 |
| WO | 00/59191 | 10/2000 |
| WO | 00/69140 | 11/2000 |

OTHER PUBLICATIONS

Trillian online user manual, Jul. 2000. 6 pages (Retrieved from www.ceruleanstudios.com/support/manual.php Apr. 12, 2006).*

(Continued)

*Primary Examiner* — Aaron Strange
(74) *Attorney, Agent, or Firm* — Greenblum & Bernstein, P.L.C.

(57) ABSTRACT

A profile server group determines whether any request for status notification is received from the client. If there is a request for status notification, a handle name included in the request is obtained, and a status flag corresponding to the handle name is extracted from the hard disk. Next, the status flag is checked. If the on-line flag is set to "ON", the user status is checked. If the user status is not "IN HIDING", the user status is notified. On the other hand, when the on-line flag is set to "OFF", the client with the handle name relating to the request notifies that it is offline.

9 Claims, 7 Drawing Sheets

OTHER PUBLICATIONS

Examiner Screenshots—Trillian version 0.62; Screenshots created Feb. 7, 2007; Software released Jan. 28, 2001.*
Trillian; Trillian.com website; Feb. 2, 2001.*
Oldversion; Oldversion.com—Trillian; Feb. 7, 2007.*
Examiner Screenshots (figs. 4 and 5)—Trillian version 0.62; Screenshots created Apr. 1, 2011; Software released Jan. 28, 2001.*
English language Abstract and partial English translation for JP 10-271159, Oct. 9, 1998.
English language Abstract and partial English translation for JP 11-259393, Sep. 24, 1999.
English language Abstract and partial English translation for JP 2000-32033, Jan. 28, 2000.
English language Abstract and partial English translation for JP 2001-14254, Jan. 19, 2001.
Tateishi, N., Internet Voyager, ASCII, vol. 24, No. 1, Japan, ASCII Corp., pp. 398-403, Jan. 1, 2000, together with a partial English language translation of the same.
English language Abstract of JP2001-222498.
English language Abstract of JP 2000-92153.

* cited by examiner

| ON-LINE FLAG | USER STATUS |
|---|---|
| ON | BEING AWAY FROM HIS/HER SEAT |
| | BUSY |
| | IN HIDING |
| | NOT DEFINED |
| OFF | NOT DEFINED |

| STATUS FLAG | ICON |
|---|---|
| BEING AWAY FROM HIS/HER SEAT | |
| BUSY | |
| NOT DEFINED | | ed in a communication system including multiple clients and a server. The method is for notifying status of the clients regarding connection to a communication network. The server stores in a first memory device the connection status and information on whether notification of the connection status is allowed. The status and information are sent from the clients. The server also receives a request for the notification of the connection status from one of the clients. Then, the server determines, in response to the received request, whether the connection status is notified based on the information stored in the first memory device, and notifies the connection status stored in the first memory device only when it is determined that the connection status is allowed to be notified.

STATUS NOTIFYING METHOD IN COMMUNICATION SYSTEM, STATUS NOTIFYING SERVER AND COMMUNICATION SYSTEM

CROSS REFERENCE TO RELATED APPLICATION

The present disclosure relates to subject matter contained in Japanese Patent Application No. 2001-126437, filed on Apr. 24, 2001 and Japanese Patent Application No. 2002-84835 filed on Mar. 26, 2002, the disclosure of which is expressly incorporated herein by reference in its entirety.

BACKGROUND OF THE INVENTION

1. Field of the Invention

The present invention relates to a status notifying method in a communication system, a status notifying server and a communication system. More particularly, the present invention relates to a status notifying method, a status notifying server, a communication system and a computer readable recording medium, in a communication system for notifying, through a server, a status of multiple clients regarding connection to a communication network.

2. Description of the Related Art

Conventionally, a technology is known that, in a client/server system, a server monitors each client connected to a communication network, stores the connection status in a memory device and notifies the connection status retrieved from the memory device in response to a request from one of the clients.

In such technologies, when the server recognizes that one of the clients logs into the network, the server stores in the memory device information indicating the client's on-line status. Then, when one of the logged-in clients queries the network status, the server sends only information on clients connected to the network. The client receives the information and displays a list of current logged-in clients, that is, on-line clients, on the display.

Recently, communication using a communication network, such as e-mail and chat, has become popular. In such communication, each client may recognize the status of the other clients logged into the network before sending a message to an on-line client.

However, the user cannot manipulate a client when the user is away from the client, even though the client is on-line. In this way, despite the fact that the user is not at the client, the server notifies other clients that the client is present in response to a request from the other clients.

As a result, even when a client queries network information notified by the server and sends a message to another on-line client, the client cannot receive a response immediately. Further, another problem is that a connection status of the client is notified to a party, even when the user of the client does not want to notify the connection status.

SUMMARY OF THE INVENTION

The present invention was made in view of these problems. It is an object of the present invention to provide a status notifying method and a status notifying server, a communication system, and computer-readable recording medium, which can notify a connection status to a communication network properly.

In view of the object, according to a first aspect of the present invention, there is provided a status notifying method The client may have multiple user names, each of which is used for connecting to the communication network. The server may store a connection status for each of the user names.

The status notification method may further include receiving an instruction for updating the connection status of one of the clients, and updating the connection status relating to all of the user names which are used by the client who sent the instruction to update.

According to a second aspect of the present invention, there is provided a status notifying server for notifying the status of multiple clients regarding connection to a communication network. The status notifying server includes a first memory for storing the connection status and information on whether notification of the connection status is allowed. The status and information are sent from the clients. The status notifying server further includes a request receiver that receives a request for the notification of the connection status from one of the clients, and a notification system that determines, in response to the received request, whether the connection status is notified based on the information stored in the first memory and notifies the connection status stored in the first memory when it is determined that the connection status is allowed to be notified.

In this case, the client may have multiple user names, each of which is used for connecting to the communication network. The first memory device may store a connection status for each of the user names.

The status notification server may further include an instruction receiver that receives an instruction for updating the connections status from one of the clients, and a system that updates connection status relating to all of the user names which are used by the client that sent the instruction to update.

According to a third aspect of the present invention, there is provided a computer readable recording medium on which is recorded a program for causing a server to notify the status of a group of clients regarding connection to a communication network. The program causes the server to store in a first memory device the connection status and information on whether notification of the connection status is allowed. The information and status are sent from the clients. The program further causes the server to receive a request for the notification of the connection status from one of the clients. The program further causes the server to determine, in response to the received request, whether the connection status is notified based on the information stored in the first memory device, and to notify the connection status stored in the first memory device when it is determined that the connection status is allowed to be notified.

Preferably, the client has multiple user names, each of which is used for connecting to the communication network. The server stores a connection status for each of the user names.

The program may further causes the server to receive an instruction for updating the connections status from one of the clients, and to update connection status relating to all of the user names which are used by the client that instructed the update.

DESCRIPTION OF THE PREFERRED EMBODIMENTS

An embodiment of the present invention will be described with reference to the appended drawings.

Figure 1:
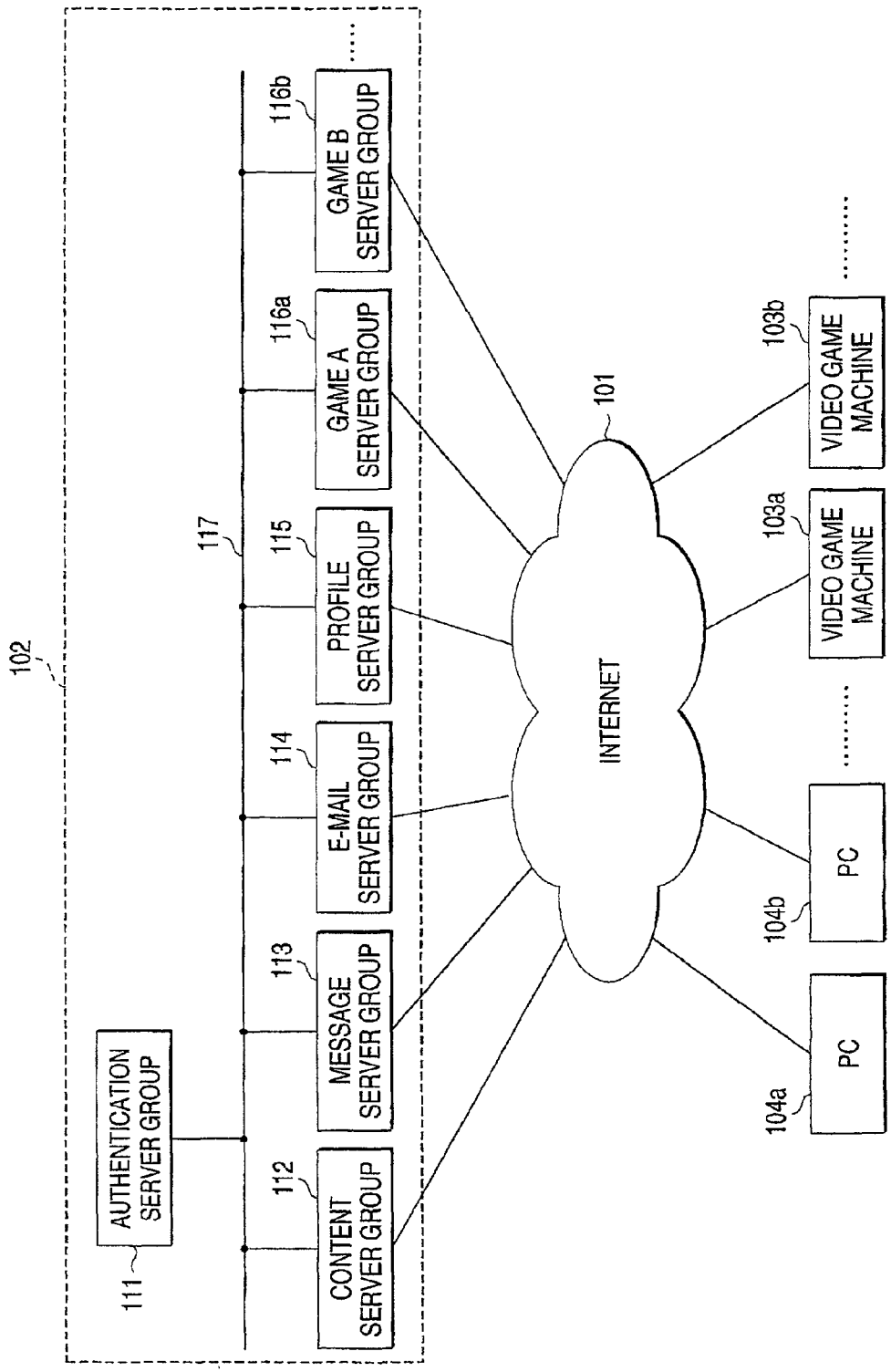
FIG. 1 is a block diagram showing an example of the system configuration according to one embodiment of the present invention.

FIG. 1 shows an example of the system configuration according to one embodiment of the present invention. FIG. 1 includes the Internet 101, to which a server group 102 of an Internet service provider (ISP), video game machines 103a and 103b, and generic computers (PC) 104a and 104b are connected. The ISP server group 102 includes multiple server groups. For example, an authentication server group 111 may be provided for managing user names for user authentication. A content server group 112 may provide content usage services described below, and a message server group 113 may provide an environment for chat and/or messaging. An e-mail server group 114 may provide e-mail services, a profile server group 115 may be provided for managing user-profiles, and game server groups 116a and 116b may provide a game environment. All of the server groups are connected through a LAN 117.

With this configuration, a user can access the authentication server group 111 in the ISP server group 102 from a client such as video game machines 103a and 103b and generic computers 104a and 104b through the Internet 101 for his/her authentication. The ISP server group 102 sends a menu screen to the authenticated client logging into the LAN 117. The user selects one of services displayed on the menu screen. In response to the selection, one of the video game machines 103a and 103b and the generic computers 104a and 104b becomes connected to one of the server groups corresponding to the selected services. Then, the user can receive different kinds of information services.

The hardware configuration for each client can include a commonly available workstation, an information processing apparatus such as a personal computer and a video game machine, and peripheral devices thereof. Functions according to the present invention, which are described below, may be implemented by a CPU, a disk device, a memory device, an input device, an output device and programs for controlling them in each of the hardware configurations.

Figure 2:
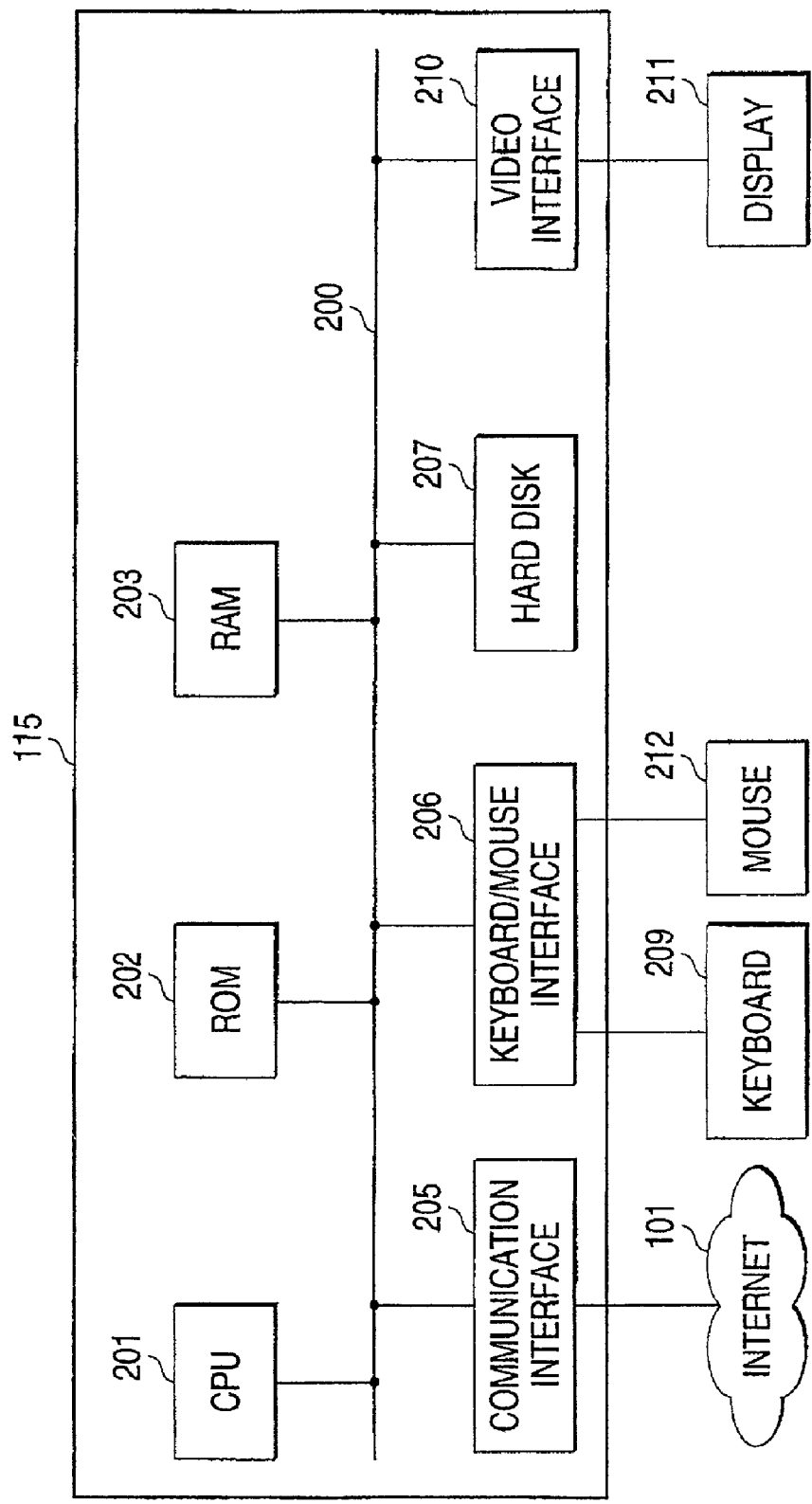
FIG. 2 is a block diagram showing an example of the hardware configuration of a profile server in which an information notifying method according to one embodiment of the present invention is implemented.

FIG. 2 conceptually shows an example of the hardware configuration of the profile server group 115 in which an information supply method according to the present invention is implemented. A CPU 201 for performing overall control, a ROM 202 in which a program for implementing a status notifying method according to the present invention, and a RAM 203, which is a temporary memory area, are connected together through a bus 200.

Further, to the bus 200, there is connected a hard disk 207. The hard disk 207 may store a computer program for implementing the status notifying method according to one embodiment of the present invention, connection status from the video game machines 103a and 103b and the generic computers 104a and 104b to the Internet 101 and a status of users. Also, a keyboard/mouse interface 206, a video interface 210 connecting to a display 211, and a communication interface 205 for connecting to the Internet 101 are connected the bus 200. The keyboard/mouse interface 206 is connected to a keyboard 209 and a mouse 212, which are used for command and/or character input.

The status notifying method according to one aspect of the present invention can be achieved when the CPU 201 reads out and executes the program code for a program for implementing processing described below from the hard disk 207. The hard disk 207 functions as a computer readable recording medium according to another aspect of the present invention.

Figure 3:
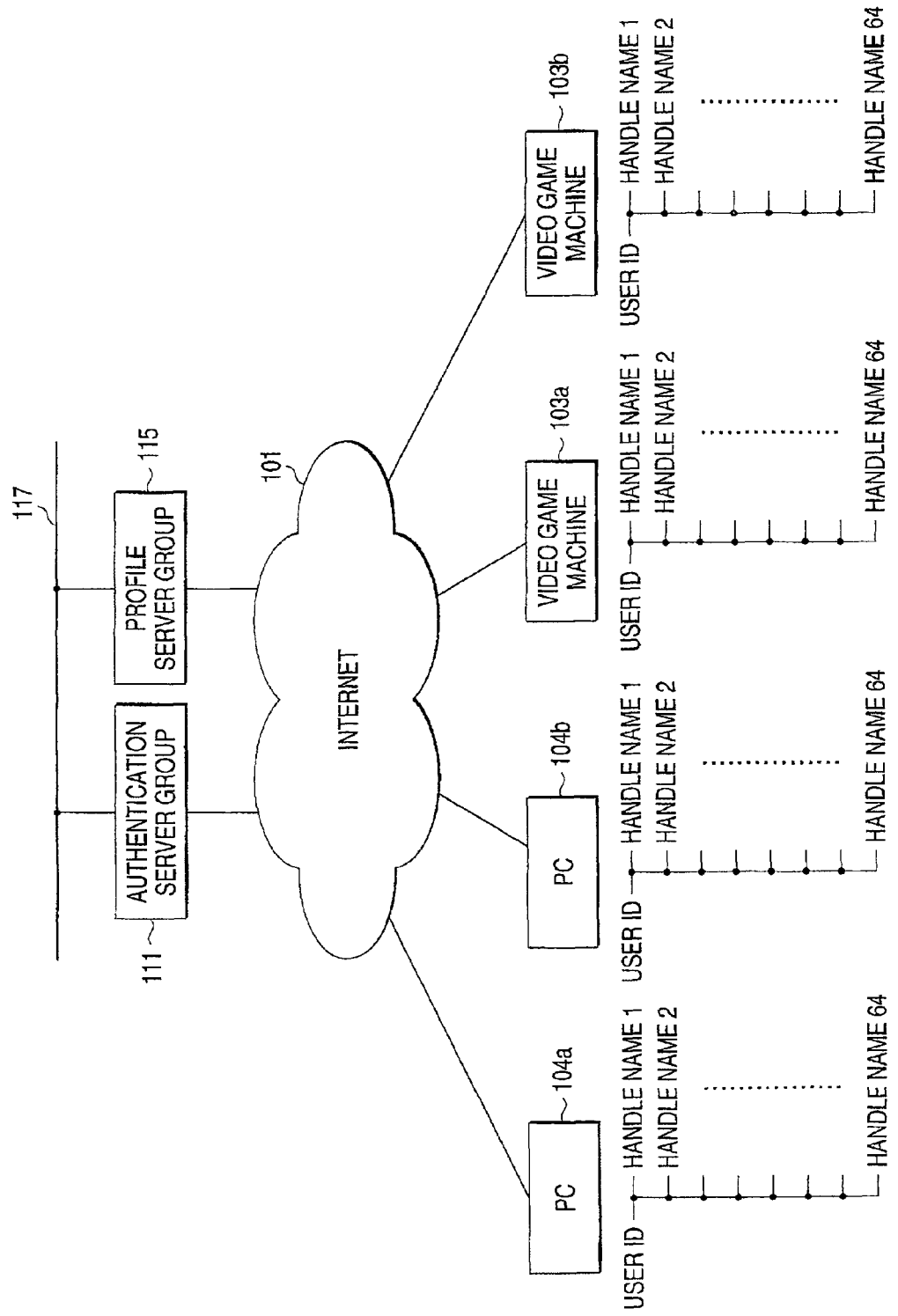
FIG. 3 is a diagram showing an outline of an account from which each client logs on the Internet, which client is connected to a system according to one embodiment of the present invention.

FIG. 3 shows an outline of authorization (through an account), whereby each client within the system according to one embodiment of the present invention logs in the Internet.

In FIG. 3, the video game machines 103a and 103b and the generic computers 104a and 104b have user ID's, respectively, for logging on the Internet 101. Further, in one embodiment, a maximum of 64 predetermined handle names can be assigned to each user ID. Of course, in other embodiments, the maximum can be larger or smaller.

The handle name is a name to be stored in the profile server group 115 through registration processing using a client and is one example of a user name according to the present invention. The handle name can be registered as follows:

A user inputs his/her user ID and password to a client and logs on the Internet 101. Then, the user requests to register a handle name with the profile server group 115. The profile server group 115 maps the user ID, handle name and password relating to the request and stores them in the hard disk 207 for registration. Then, the user having registered the handle name sends the user ID, the registered handle name and password, and requests the log-in to the authentication server group 111. The authentication server group 111 obtains information of the user ID corresponding to the received handle name from the profile server group 115 and authenticates the user for the requested log-in.

In this embodiment, the user ID, which was once input by the user and stored in the client, is automatically sent from the client when logging-in. Therefore, a user only needs to input his/her handle name and password to the client for logging-in, and can receive different kinds of services provided by the ISP server group 102 without inputting his/her user ID.

Figures 4, 5:
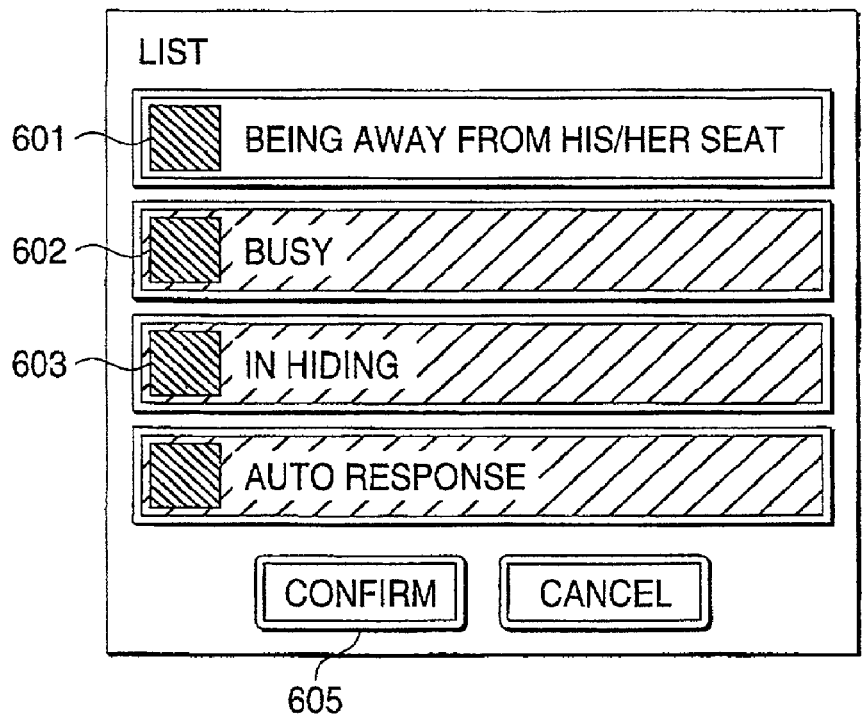
FIG. 4 is a diagram showing an example of the configuration of a status flag stored in a hard disk in the profile server according to one embodiment of the present invention.
FIG. 5 is a diagram showing an example of the screen to be displayed on a display of a client by a program for instructing a change of the user status according to one embodiment of the present invention.

FIG. 4 is a diagram showing an example of the configuration of a flag relating to a status (called "status flag" hereinafter) corresponding to each client, which is stored in the hard disk 207 in the profile server 115. As shown in FIG. 4, the status flag includes an on-line flag indicating a connection status and a user status. The on-line flag indicates whether the client is logged into the network. When the flag is "ON", it means that the client is logged-in, while when the flag is "OFF", it means that the client is not logged-in. The user status is a flag which can be set when the on-line flag is "ON" and can be one of the values: "BEING AWAY FROM HIS/HER SEAT", "BUSY", "IN HIDING" and "NOT DEFINED".

The "BEING AWAY FROM HIS/HER SEAT" user status indicates that the user is apart from the on-line client. This may be the case when the user is away from his/her seat in front of the client and cannot respond immediately to requests from other clients. The "BUSY" status indicates that the user cannot respond immediately to requests from the other client because, for example, the user is using his/her client for gaming. The "IN HIDING" status is a value to be set when the user does not want to reveal that his/her client is logged into the network, that is, when the notification of the connection status is not allowed.

In FIG. 4, the on-line flag is switched based on the authentication of a client logging into the network and/or an instruction from the authentication server 111 monitoring the on-line client. In other words, the authentication server group 111 monitors the client logging into the network and logging off the network, and instructs the profile server group 115 to switch the on-line flag every time the connection status is switched from on-line to offline or from offline to on-line. The profile server 115 changes the set value in the on-line flag in response to the instruction.

Further, the user status is switched based on a switching instruction from the logged-in client as described below.

Next, processing for instructing to switch a user status will be described, the processing being performed by a logged in client. FIG. 5 shows an example of a screen to be displayed on a display of a client through a program for instructing the user-status switching performed in the client. On this screen, a button 601 is pressed when the profile server 115 is instructed to switch the user-status to "BEING AWAY FROM HIS/HER SEAT"T. A button 602 is pressed when the profile server 115 is instructed to switch the user-status to "BUSY"T. A button 603 is pressed when the profile server 115 is instructed to switch the user-status to "IN HIDING".

The user uses a mouse or a controller connected to the client to select a desired button of these buttons. Then, by pressing a confirmation button 605, how the user-status is switched is determined. When the client recognizes the button manipulation, the client generates a switching instruction including a user-status value corresponding to the pressed button and sends it to the profile server 115.

Figure 6:
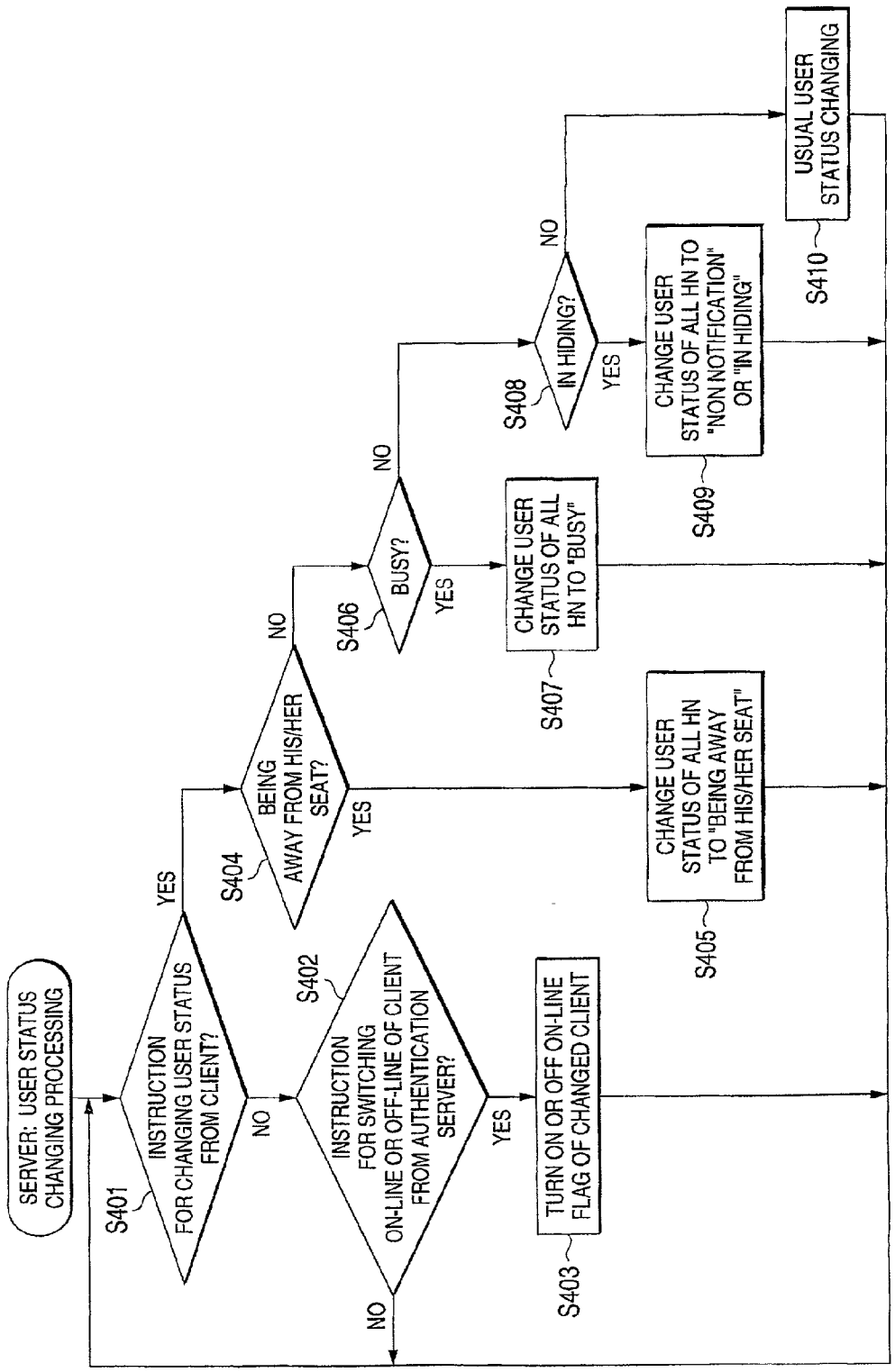
FIG. 6 is a flowchart showing a flow of processing for switching a status flag, which is performed by the profile server according to one embodiment of the present invention.

Next, steps for processing of switching a connection-status flag will be described, which processing is performed by the profile server 115, with reference to a flowchart shown in FIG. 6.

The profile server group 115 periodically checks whether any instruction to switch the user-status is received from the client (step S401). If there is no switching instruction, the profile server group 115 checks whether any on-line or offline switching instruction for the client is received from the authentication server group 111 (step S402). When there is an on-line or offline switching instruction, the on-line flag of a corresponding client is set to ON or OFF based on the switching instruction (step S403), and the checking process at step S401 is repeated. If there is neither on-line nor offline switching instructions, the checking process at step S401 is repeated.

In the checking process at step S401, when an instruction to switch the user status is received from the client, the processing goes to step S404. At step 404, the instruction is analyzed to determine whether the user-status included in the instruction is "BEING WAY FROM HIS/HER SEAT". If it is "BEING AWAY FROM HIS/HER SEAT", the user status corresponding to all handle names (HN) used by the client having sent the switching instruction are reset to "BEING AWAY FROM HIS/HER SEAT" (step S405). Then the processing returns to the checking process at step S401 again.

In the determination process at the step S404, the processing goes to step S406 when the user-status in the switching instruction is not "BEING AWAY FROM HIS/HER SEAT" and, it is determined whether the user status in the switching instruction is "BUSY". Then, when it is "BUSY", the user status corresponding to all handle names used by the client having sent the switching instruction are reset to "BUSY" (step S407). Then, the processing returns to the checking process at step S401 again.

In the determination process at step S406, the processing goes to step S408 when the user status in the switching instruction is not "BUSY". Then, it is determined whether the user status in the switching instruction is "IN HIDING". Then, when it is "IN HIDING", the user status corresponding to all handle names used by the client having sent the switching instruction are reset to "IN HIDING" (step S409). Then, the processing returns to the checking process at step S401 again.

In the checking process at the step S408, when the user status in the switching instruction is not "IN HIDING", the processing goes to step S410. There, the user status corresponding to all handle names used by the client having sent the switching instruction is switched to the "USUAL USER STATUS" (step S410). Then, the processing returns to the checking process at step S401 again.

Figure 7:
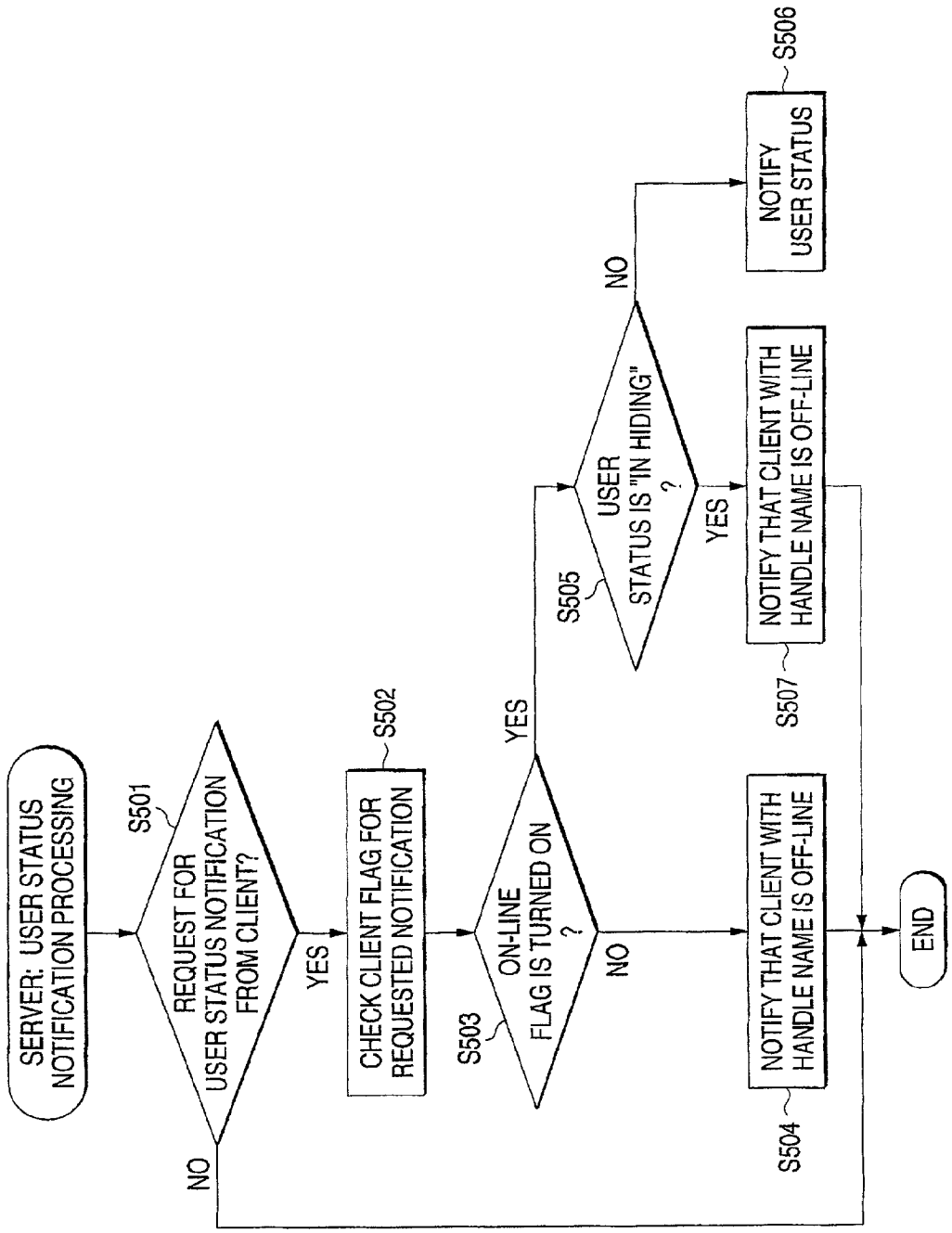
FIG. 7 is a flowchart showing the steps of status-notifying processing performed by the profile server according to one embodiment of the present invention.

Next, steps for exemplary status notifying processing will be described, which processing is performed by the profile server group 115 based on a request for status notification from a client, with reference to a flowchart shown in FIG. 7.

The profile server group 115 determines whether any request for status notification is received from the client (step S501). If there is a request for status notification, a handle name included in the request is obtained, and a status flag corresponding to the handle name is extracted from the hard disk 207 (step S502).

Next, the status flag is checked (step S503). If the on-line flag is set to "ON", it is checked whether the user status is "IN HIDING" (step S505). If the user status is not "IN HIDING", the user status is notified (step S506). If the user status is "IN HIDING", the off-line status is notified (S507). On the other hand, when the on-line flag is set to "OFF", the client with the handle name relating to the request notifies that it is offline (step S504)

In this embodiment, the status notification by the profile server group 115 can be performed by sending the status flag.

Figures 8, 9:
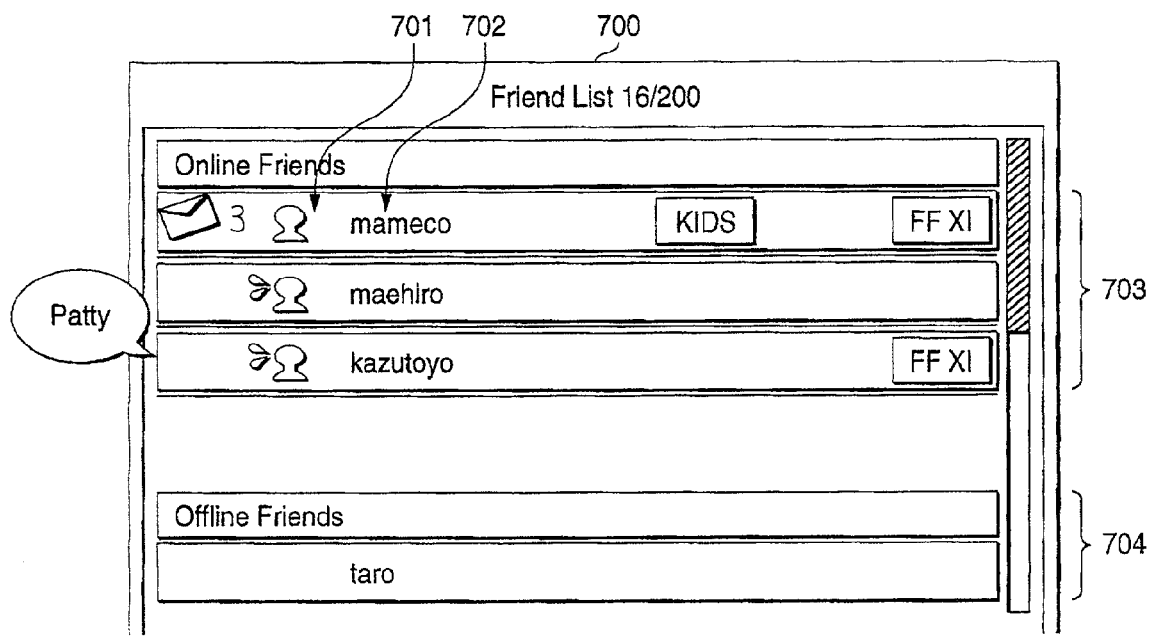
FIG. 8 is a diagram showing an example of the screen to be displayed on a display of client receiving status notification according to one embodiment of the present invention.
FIG. 9 is a diagram showing an example of an icon stored in a memory device of the client according to one embodiment of the present invention.

FIG. 8 shows an example of a screen to be displayed on a display of a client having received the status notification from the profile server 115. As shown in FIG. 8, a list 700 includes a list 703 of connection status for on-line clients with listed handle names and a list 704 of connection status for offline clients with listed handle names. An icon 701 included in the list 703 varies in form to indicate the user status of a handle name 702.

The user status notification with the variation in icon form is specifically performed as follows: A client specifies at least one handle name and requests the profile server group 115 for the status notification. The profile server group 115 receives the request and extracts the status flag as described above. Then the status flag is returned to the requested client. Icons corresponding to the types of user status are pre-stored in the memory device of the client as shown in FIG. 9. When the status Slag is returned from the profile server 115, an icon is extracted from the memory device based on the notified content included in the information. Then, the icon corresponding to the handle name is displayed on the display.

While the preferred embodiment of the present invention is described above, the present invention is not limited to the embodiment. Other embodiments are possible. For example, the client in the present invention may include any kind of information processing apparatus which can communicate with an ISP server group. Therefore, the present invention can be applied to not only the above-described embodiment, but also to an information processing apparatus such as a mobile telephone and a personal digital assistant(PDA) having an Internet connection function.

Further, the Internet 101 may be a communication network preferred by a system user in accordance with the usage and may be a communication line using a Local Area Network (LAN), a publicly switched telephone line and a communication satellite.

While, in the embodiment, the icons indicating user-status are stored in the client, an icon may be sent from the profile server group in response to a request for status notification and the icon received by the client may be displayed. The status for the connection to the communication network may be indicated by not only an icon, but also by an image such as a photograph and characters.

The display screen in the embodiment is only an example for the explanation purpose, and the arrangement and the size of the display area are not limited to the example shown in the embodiment of the present invention.

While, in the embodiment, the example where the information processing devices each having a different function are connected to the LAN 117, it is apparent for those skilled in the art that the multiple functions may be implemented by one information processing device.

Furthermore, different kinds of variations other than the embodiments described above are possible. Those variations are within the scope of the present invention as far as it is based on the technical spirit described in the appended claims.

The present invention can be implemented by using at least one computer program which can be executed on a computer system including processors combined to receive and send data and instructions from/to a recording medium, an input device and an output device. The computer program may be described in high-level procedure type programming language, object-oriented programming language, assembly language, machine language or markup language.

Accordingly, a processor receives a computer program from a recording medium. The recording medium substantially incorporating a command from the computer program may be a semiconductor memory element such as a flash memory element, a magnetic disk such as an internal hard disk and a removable disk, and a CD-R.

As described above, according one embodiment of the present invention, a user of a client can avoid connection status notification as necessary.

Further, since a user status is indicated by an image such as an icon displayed under each handle name for the user, it is easier to recognize the user status.

Furthermore, the connection status for all user names (handle names) owned by a client can be set through a single instructing operation.

What is claimed is:

1. A status notifying method performed in a server operating in a communication system, including a plurality of clients and the server, for notifying a connection status and a user status of the plurality of clients regarding connection to a communication network, at least a selected client of the plurality of clients having a plurality of user names for connecting to the communication network, the method comprising:

storing, in a memory, an on-line flag that indicates the connection status of the selected client, a status flag that indicates the user status of the selected client, and information on whether notification of one of the connection status and the user status is allowed, the on-line flag and the status flag each being stored in association with all of the plurality of user names of the selected client;

receiving, from the selected client, a first instruction for updating the on-line flag of the selected client to one of an online status and an offline status;

updating the on-line flag stored in association with all of the plurality of user names of the selected client to the one of the online status and the offline status in response to the first instruction;

receiving, from the selected client when the on-line flag of the selected client is the online status, a second instruction for updating the status flag of the selected client to one of an away, a busy, a hiding, and an undefined status;

updating the status flag stored in association with all of the plurality of user names of the selected client to the one of the away, the busy, the hiding, and the undefined status in response to the second instruction;

receiving a request for notification of one of the connection status and the user status from one of the plurality of clients;

determining, in response to the received request, whether the one of the connection status and the user status is allowed to be notified based on the information stored in the memory; and notifying the one of the connection status and the user status via one of the on-line flag and the status flag stored in the memory only when it is determined that the one of the connection status and the user status is allowed to be notified, wherein the on-line flag and the status flag of the selected client are collectively associated with all of the plurality of user names of the selected client, each of the user names of the selected client is updated to the one of the online status and the offline status in response to receiving only the first instruction, and each of the user names of the selected client is updated to the one of the away, the busy, the hiding, and the undefined status in response to receiving only the second instruction.

2. The status notifying method according to claim 1, wherein the on-line flag of the selected client is further updated in response to the selected client completing a logging-in process and a logging-off process.

3. The status notifying method according to claim 1, wherein the connection status of all of the associated user names of the selected client is automatically updated to the one of the online status and the offline status in response to the first instruction, without the selected client identifying individual ones of the user names to be updated.

4. A status notifying server for notifying a connection status and a user status of a plurality of clients regarding connection to a communication network, at least a selected client of the plurality of clients having a plurality of user names for connecting to the communication network, the server comprising:
   a memory for storing an on-line flag that indicates the connection status of the selected client, a status flag that indicates the user status of the selected client, and information on whether notification of one of the connection status and the user status is allowed, the on-line flag and the status flag each being stored in association with all of the plurality of user names of the selected client;
   a first instruction receiver that receives a first instruction for updating the on-line flag of the selected client to one of an online status and an offline status;
   a first updater that updates the on-line flag stored in association with all of the plurality of user names of the selected client to the one of the online status and the offline status in response to the first instruction;
   a second instruction receiver that receives, when the on-line flag of the selected client is the online status, a second instruction for updating the status flag of the selected client to one of an away, a busy, a hiding, and an undefined status;
   a second updater that updates the status flag stored in association with all of the plurality of user names of the selected client to the one of the away, the busy, the hiding, and the undefined status in response to the second instruction;
   a request receiver that receives a request for notification of one of the connection status and the user status from one of the plurality of clients; and
   a notifier that determines, in response to the received request, whether the one of the connection status and the user status is allowed to be notified based on the information stored in the memory and notifies the one of the connection status and the user status via one of the on-line flag and the status flag stored in the memory when it is determined that the one of the connection status and the user status is allowed to be notified,
   wherein the on-line flag and the status flag of the selected client are collectively associated with all of the plurality of user names of the selected client,
   each of the user names of the selected client is updated to the one of the online status and the offline status in response to receiving only the first instruction, and
   each of the user names of the selected client is updated to the one of the away, the busy, the hiding, and the undefined status in response to receiving only the second instruction.

5. The status notifying server according to claim 4, wherein the on-line flag of the selected client is further updated in response to the selected client completing a logging-in process and a logging-off process.

6. The status notifying server according to claim 4, wherein the first updater automatically updates the connection status of all of the associated user names of the selected client to the one of the online status and the offline status in response to the first instruction, without the selected client identifying individual ones of the user names to be updated.

7. A non-transitory computer readable recording medium on which is recorded a program for causing a server to notify a connection status and a user status of a plurality of clients regarding connection to a communication network, at least a selected client of the plurality of clients having a plurality of user names for connecting to the communication network, the program causing the server to execute:
   storing, in a memory, an on-line flag that indicates the connection status of the selected client, a status flag that indicates the user status of the selected client, and information on whether notification of one of the connection status and the user status is allowed, the on-line flag and the status flag each being stored in association with all of the plurality of user names of the selected client;
   receiving, from the selected client, a first instruction for updating the on-line flag of the selected client to one of an online status and an offline status;
   updating the on-line flag stored in association with all of the plurality of user names of the selected client to the one of the online status and the offline status in response to the first instruction;
   receiving, from the selected client when the on-line flag of the selected client is the online status, a second instruction for updating the status flag of the selected client to one of an away, a busy, a hiding, and an undefined status;
   updating the status flag stored in association with all of the plurality of user names of the selected client to the one of the away, the busy, the hiding, and the undefined status in response to the second instruction;
   receiving a request for notification of one of the connection status and the user status from one of the plurality of clients;
   determining, in response to the received request, whether the one of the connection status and the user status is allowed to be notified based on the information stored in the first memory device; and
   notifying the one of the connection status and the user status via one of the on-line flag and the status flag stored in the memory when it is determined that the one of the connection status and the user status is allowed to be notified,
   wherein the on-line flag and the status flag of the selected client are collectively associated with all of the plurality of user names of the selected client,
   each of the user names of the selected client is updated to the one of the online status and the offline status in response to receiving only the first instruction, and
   each of the user names of the selected client is updated to the one of the away, the busy, the hiding, and the undefined status in response to receiving only the second instruction.

8. The non-transitory computer readable recording medium according to claim 7, wherein the on-line flag of the selected client is further updated in response to the selected client completing a logging-in process and a logging-off process.

9. The non-transitory computer readable recording medium according to claim 7, wherein the connection status of all of the associated user names of the selected client is automatically updated to the one of the online status and the offline status in response to the first instruction, without the selected client identifying individual ones of the user names to be updated.

* * * * *